United States Patent [19]

Oskouy

[11] Patent Number: 5,600,650
[45] Date of Patent: Feb. 4, 1997

[54] METHOD AND APPARATUS FOR SYNTHESIZING CLOCK SIGNALS FOR USE WITH AN ASYNCHRONOUS TRANSFER MODE SYSTEM HAVING SELECTABLE DATA TRANSMISSION RATES

[75] Inventor: Rasoul M. Oskouy, Fremont, Calif.

[73] Assignee: Sun Microsystems, Inc., Mountain View, Calif.

[21] Appl. No.: 499,728

[22] Filed: Jul. 7, 1995

[51] Int. Cl.⁶ .................................. H01J 13/00; H04J 3/06
[52] U.S. Cl. .......................... 370/468; 370/474; 370/395; 395/200.13; 395/200.20
[58] Field of Search .............................. 370/60, 60.1, 79, 370/84, 94.1, 94.2, 100.1; 395/325, 500, 200.02, 200.13, 200.19, 200.20; 375/219, 220, 222

[56] References Cited

U.S. PATENT DOCUMENTS

5,375,121 12/1994 Nishino et al. ..................... 370/94.2
5,418,786  5/1995 Loyer et al. ........................ 370/94.2
5,485,456  1/1996 Shtayer et al. ....................... 370/60

Primary Examiner—Alpus H. Hsu
Attorney, Agent, or Firm—Blakely Sokoloff Taylor & Zafman

[57] ABSTRACT

An asynchronous transfer mode (ATM) segmentation and reassembly (SAR) chip is provided for interfacing a host computer with an ATM system having a physical layer (PHY) chip incorporating, for example, a Unified Test and Operations Physical Interface for ATM (UTOPIA) protocol. The PHY chip is capable of operating at both 155 Mbps and 622 Mbps data transmission rates. The UTOPIA protocol requires a clock which is provided by the SAR chip. In an exemplary embodiment described herein, the SAR chip is configured to accommodate both data transmission rates and to synthesize appropriate clock signals for driving the PHY chip which facilitate the clocking out of data and the sampling of data.

20 Claims, 6 Drawing Sheets

METHOD AND APPARATUS FOR SYNTHESIZING CLOCK SIGNALS FOR USE WITH AN ASYNCHRONOUS TRANSFER MODE SYSTEM HAVING SELECTABLE DATA TRANSMISSION RATES

BACKGROUND OF THE INVENTION

1. Field of the Invention

The invention generally relates to interface systems for interfacing a computer system host to an asynchronous transfer mode (ATM) system and, in particular, to a method and apparatus for synthesizing clock signals for use with an ATM system capable of operating at two-data transmission rates.

2. Description of Related Art

ATM technology is emerging as the preferred technology for implementing broadband integrated services data networks ISDNs (B-ISDN). A B-ISDN is a system for interconnecting computer systems, local area networks (LANs), telephones, facsimiles, etc., to facilitate communication of data, voice and video between the systems. B-ISDN typically employs fiber optics as a communication medium. An ATM system facilitates the transmission of data over the B-ISDN by defining a set of "data connections" where each connection represents a virtual circuit having a particular source and destination and an associated data transmission rate.

Data provided by a computer system, LAN, telephone, etc., may initially be stored in packets of data. ATM technology, however, requires the data to be stored and processed within cells of data. Accordingly, a method or apparatus must be provided for segmenting packets into cells and for reassembling cells into packets. Typically, a segmentation and reassembly (SAR) application specific integrate circuit (ASIC) chip is provided for connecting the computer system to an ATM system.

One particular implementation of an ATM system employs a physical layer (PHY) chip configured to implement a Universal Test and Operational Physical Interface (UTOPIA) protocol. The PHY chip operates as a "front end" to the overall ATM system. For ATM, the PHY chip is typically a Synchronous Optical Network (SONET) framer and is connected to a fiber optic line. The PHY chip receives cells from the SAR chip for transference to other PHY chips. The PHY chip also receives cells along the fiber optic line for forwarding to the SAR chip for reassembly into packets for eventual transference to the computer system or LAN.

In this arrangement, the SAR chip operates as a master and the PHY chip operates as a slave. For example, to transfer data from the PHY chip to the SAR chip, the PHY chip provides a signal indicating that the PHY chip has data available. The SAR chip then initiates actual transference of the data from the PHY chip. Likewise, to transfer data from a SAR chip to PHY chip, the SAR chip initiates the transference.

A PHY chip employing the UTOPIA protocol is capable of operating at either 155 megabits per second (Mbps) or 622 Mbps. 155 Mbps is achieved using a 20–25 megahertz (MHz) clock signal whereas 622 Mbps is achieved using a 40–50 MHz clock signal. (Actually, 155 Mbps may be achieved using a 19.44 MHz clock signal and 622 Mbps may be achieved using a 38.88 MHz signal. These frequencies represent the lowest frequencies with which the corresponding Mbps data transfer rate may be achieved. The 25 MHz and 50 MHz limits are protocol limits defined by the UTOPIA specification.) The PHY chip is configured to receive the appropriate clock signal, whether 20–25 MHz or 40–50 MHz, from the ATM system through a single pair of clock pins (R_CLK and T_CLK). The PHY chip is also configured to receive a variety of other signals including data and control signals which are associated either with R_CLK or T_CLK.

Conventional SAR chips for use with a UTOPIA PHY chip operate only at 155 Mbps and provide only a 20 MHz signal to the PHY chip. It is anticipated that 622 Mbps SAR chips will be developed which operate only at 622 Mbps by operating internally at 40–50 MHz while also driving the PHY chip at 40–50 MHz.

It would be desirable, however, to provide an SAR chip for use with a UTOPIA, or similar, PHY chip which is capable of operating at either 155 Mbps or 622 Mbps. A significant problem, however, in providing such an SAR chip is accounting for the two different required clock rates. More specifically, a method or protocol is required for allowing data to be clocked out of the SAR chip and thereafter unambiguously sampled by the PHY chip and vice versa. This is particularly problematic because of possible phase delays, of generally unknown duration, occurring between the clock signals operating internally within the SAR chip and the actual clock driving signals received by the PHY chip. In other systems, similar phase or timing delays are accounted for by iteratively tuning the relative phases of the separate systems, perhaps by inserting various delay lines, etc. The need to iteratively tune a system, however, adds to the overall cost of developing the system. Accordingly, it is also desirable to provide a system for interfacing with a PHY chip, or similar, which is not only capable of operating at either 155 Mbps or 622 Mbps but which also allows data to be clocked and sampled unambiguously without requiring conventional iterative tuning techniques. In other words, it is desirable to provide a system design solution, rather than a iterative tuning solution, for ensuring unambiguous data transfer. It is to these ends that aspects of the present invention are drawn.

SUMMARY OF THE INVENTION

In accordance with one aspect of the invention, a method and apparatus is provided for configuring a SAR chip to operate at one of two selectable data transmission rates for use with an external system, such as a UTOPIA PHY chip, also configured for operating at one of two data transmission rates.

In an exemplary embodiment, the SAR chip is configured to operate at 155 Mbps with a first clock signal or at 622 Mbps with a second clock signal. The first clock signal may be in the range of, for example, 19.44 MHz–25 MHz and the second clock signal may be in the range of 38.88 MHz–50 MHz. In the following, 20 MHz and 40 MHz clock signals are assumed. The external system is a PHY chip employing UTOPIA protocol. As far as clock signals are concerned, the PHY chip is capable of receiving only a single pair of clock signals (T_CLK and R_CLK) and capable of clocking data out, and sampling data in, only in synchronization with the single pair of clock signals. The PHY chip is also capable of receiving and transmitting associated control and data signals.

To transmit data to the PHY chip in the 622 Mbps mode, the SAR chip generates a 40 MHz clock signal (M_CLK) and clocks out data synchronized to M_CLK. The system inverts M_CLK to form T_CLK. R_CLK is set equal to M_CLK. To transmit data in the 155 Mbps mode, the SAR chip sets both T_CLK and R_CLK to M_CLK/2. Data is clocked out in synchronization with M_CLK. However, whereas data may be clocked out as often as every rising edge of M_CLK in the 622 Mbps mode, data may be clocked out only as often as every other rising edge of M_CLK in the 155 Mbps mode. In either case, the PHY chip samples the data on the next rising edge of the transmitted clock signal (T_CLK).

To receive data from the UTOPIA system in the 155 Mbps mode, the SAR chip employs the R_CLK signal (also transmitted to the UTOPIA system) and samples data at rising edges of that signal. In other words, data is not sampled using the internal clock of the SAR chip (M_CLK). Rather, data is sampled using R_CLK, then is merged to M_CLK. The method for sampling data in the 155 Mbps transmission mode is the same as for the 622 Mbps mode, with the exception that R_CLK is only 20 MHz, rather than 40 MHz.

The foregoing method for clocking data out from, and sampling data into, the SAR chip is provided, in part, to ensure adequate sample and hold times within both the SAR chip and the PHY chip without requiring any iterative system tuning. In particular, by inverting clock signals in appropriate circumstances and by employing R_CLK signals rather than internal clock signals (M_CLK) in other circumstances, data is clocked out or sampled with about one half a clock period for set up and one half a clock period for hold. Depending upon the actual system transmission delay between the SAR chip and the PHY chip, the hold period may be somewhat less and the set up period somewhat greater. This is advantageous because hold operations typically require considerably less time than set up operations. Of course, time delays cannot be so great that the available time for the hold operation is reduced beyond a minimum acceptable amount. For practical systems, such is not a problem. Another advantage of the system, is that for transmission of data from the SAR chip to the PHY chip the data need not be merged to T_CLK signal, but may simply be clocked out in synchronization with the M_CLK signal. Merging data to a second clock signal is only required for reception of data (which is synchronized to R_CLK and must be subsequently merged to M_CLK).

With the foregoing, a SAR chip is provided for interfacing with a PHY chip configured with UTOPIA protocol wherein the SAR chip is capable of operating at either 622 Mbps or 155 Mbps and wherein an effective system design is provided for clocking data out and sampling data which eliminates the need for iterative tuning techniques. Accordingly, the broad objectives set forth above are achieved. Other objects, advantages and features of the invention will be apparent from the remaining description in conjunction with the attached drawings.

DETAILED DESCRIPTION OF EXEMPLARY EMBODIMENTS OF THE INVENTION

Referring to the figures, exemplary embodiments of the invention will now be described. Initially, principles of the invention applicable to a wide variety of specific embodiments will be described with reference to FIGS. 1–4. Then, a specific exemplary implementation of the invention, and an overall network in which it may be employed, will be described with reference to FIGS. 5 and 6.

Figure 1:
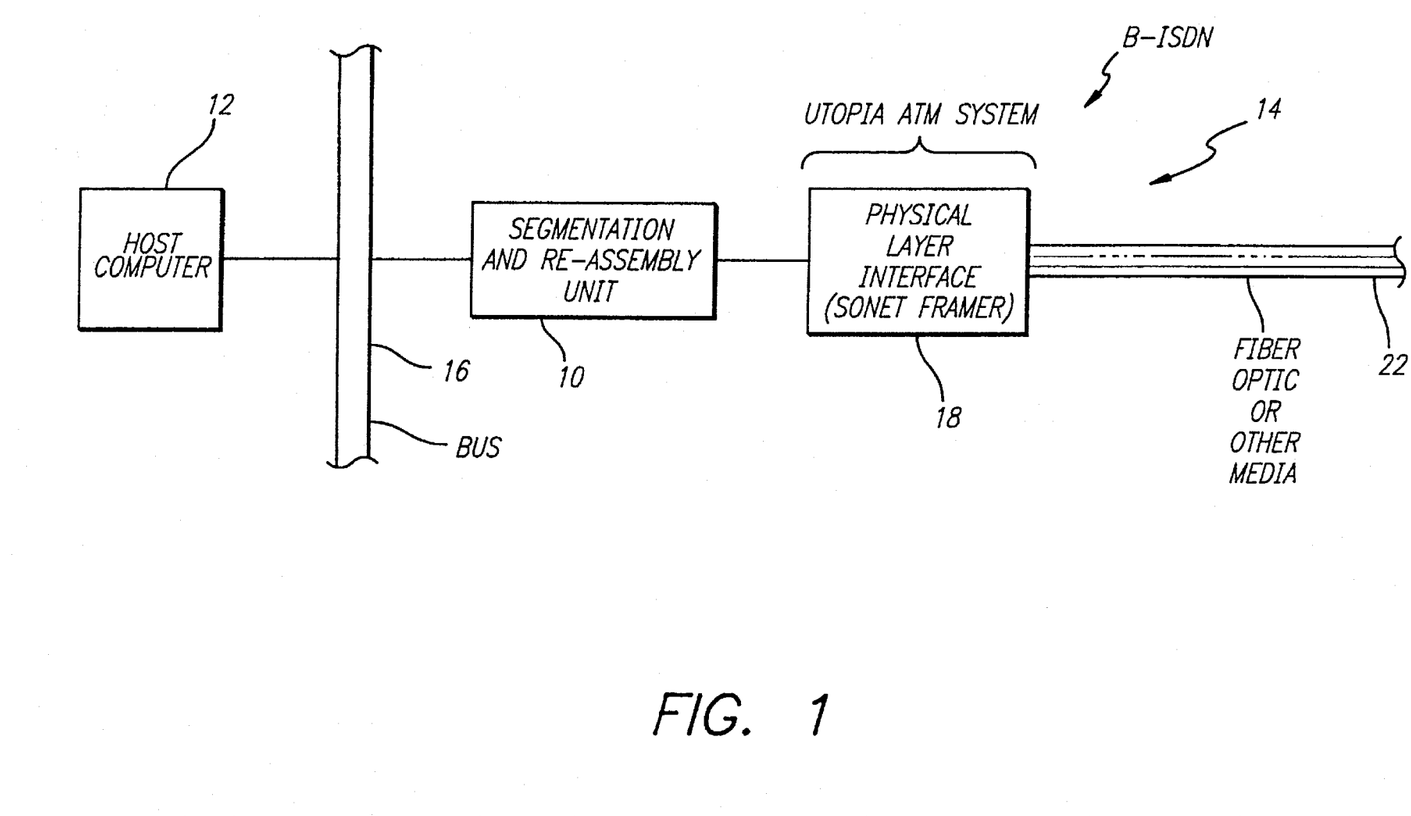
FIG. 1 is a block diagram illustrating a host/ATM system interface (SAR chip) for converting packets transferred from the host into cells for transmission to the ATM system and vice versa.

FIG. 1 illustrates a SAR chip 10 interconnecting a host computer system 12 and a B-ISDN communication system 14. Connection to the host computer is provided through a system bus 16 and connection to the B-ISDN is provided through a PHY chip 18. In one embodiment, host computer 12 is a Sun Computer Workstation and the bus is an SBus. PHY chip 18 is a SONET framer implementing a UTOPIA protocol for transmitting data along a fiber optic cable 22 or other media. SAR chip 10 may be employed in combination with other systems or equipment. Indeed, principles of the invention may be exploited in non-ATM systems as well.

SAR chip 10 operates to convert packets transferred from host 12 into cells for transference to PHY chip 18 and vice versa. Herein, conversion of packets to cells is referred to as segmentation or "cellification". Conversion of cells to packets is referred to as reassembly or "packetization".

As noted above, PHY chip 18 implements the UTOPIA protocol. The PHY chip is configured to operate at either 155 Mbps or 622 Mbps and requires a pair of clock signals (T_CLK and R_CLK) to be provided by SAR chip 10. (The PHY chip also requires a variety of data and control signals which will not be described in detail herein.) For 155 Mbps, the clock rate is about 20 MHz (19.44 MHz). For 622 Mbps, the clock rate is about 40 MHz (38.88 MHz). SAR chip 10 is configured to synthesize the 20 MHz and 40 MHz clock signals in a manner which facilitates the transmission of data between SAR chip 10 and PHY chip 18. In particular, the clock signals are synthesized such that adequate set up and hold times are achieved in both the PHY chip and in the SAR chip during data transference.

Figure 2:
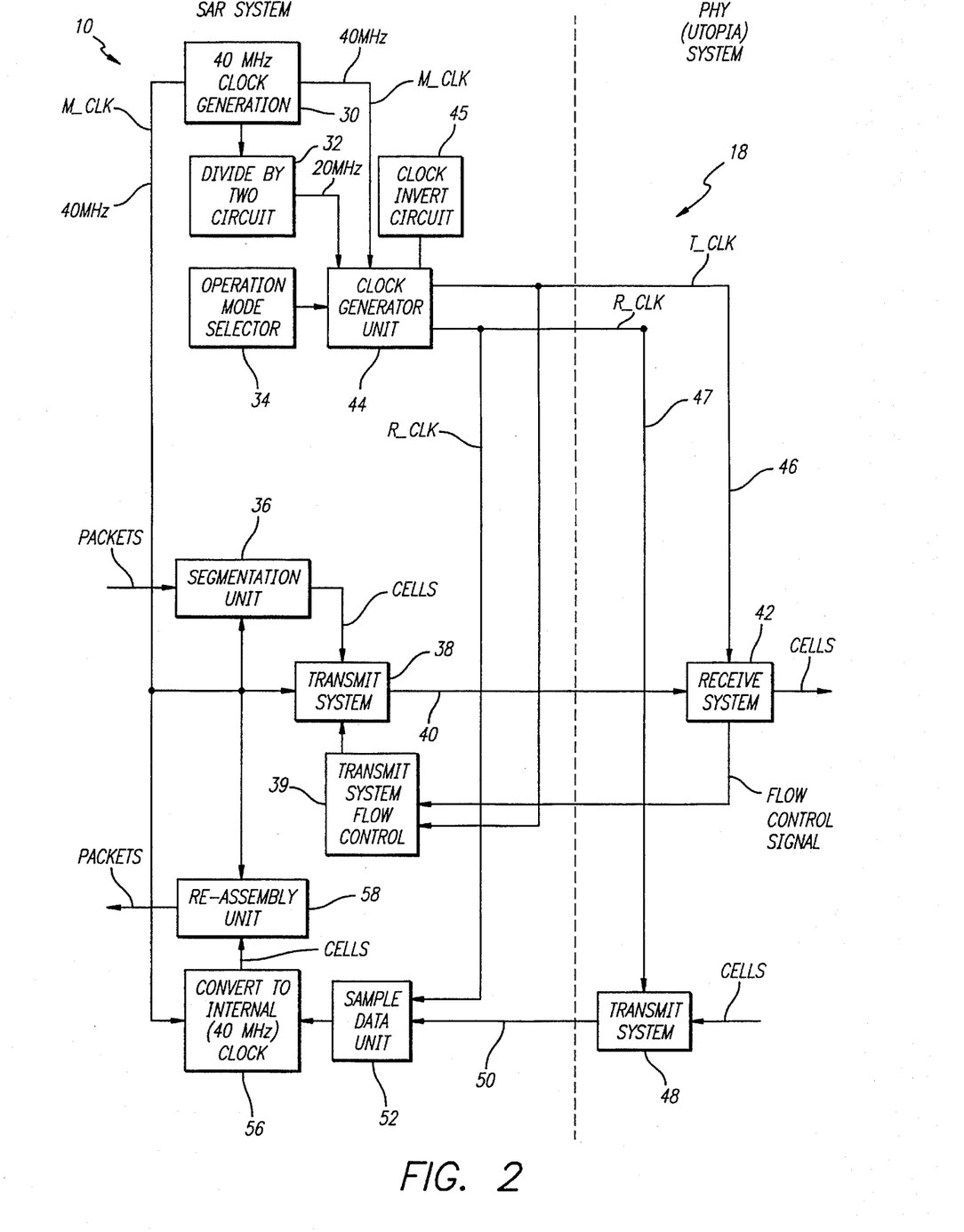
FIG. 2 is a block diagram of the SAR chip of FIG. 1 particularly illustrating elements for transmitting and receiving data at either 155 MbDs or 622 MbDs.

FIG. 2 illustrates the pertinent elements of SAR chip 10 and PHY chip 18 for controlling the synthesis of clock signal and the transmission and reception of data. Briefly, SAR chip 10 is configured to operate in either a first mode or a second mode corresponding to the 622 Mbps and the 155 Mbps data rates, respectively.

For the 622 Mbps, a 40 MHz clock signal is generated (M_CLK), then inverted (T_CLK). Data for transmission to the PHY chip is clocked out of the SAR chip in synchronization with rising edges of M_CLK. T_CLK is sent to the PHY chip. The PHY chip is configured, in accordance with the UTOPIA protocol, to sample data at rising edges of T_CLK. As will be illustrated below, the foregoing ensures adequate set up on hold times within the PHY chip.

Also within the 622 Mbps mode, the SAR chip transmits M_CLK to the PHY chip as R_CLK. To transmit data from PHY chip to the SAR chip, the PHY chip clocks data out at rising edges of R_CLK which, in this case, is the non-inverted 40 MHz signal. The SAR chip is configured to receive both the data sent from PHY chip and the R_CLK signal. Hence, the ATM system does not sample data based on its internal 40 MHz clock signal (M_CLK). Rather, the SAR chip samples data based on the R_CLK signal delayed with respect to M_CLK. Data received by the SAR chip using R_CLK is then resynchronized or merged to M_CLK.

For the second mode of operation, wherein data is transmitted at the 155 Mbps transmission rate, the internal 40 MHz clock signal M_CLK is converted to a pair of 20 MHz clock signals (T_CLK and R_CLK) which are transmitted to the UTOPIA system. Unlike the 622 Mbps mode of operation, the transmitted clock signal is not inverted. The SAR chip clocks data out to the PHY chip in synchronization with every other rising edge of the internal 40 MHz clock signal (M_CLK). (Of course, data may not be clocked at every other rising edge of the clock signal. Rather, data is clocked out only at selected rising edges in accordance with the overall data transference protocol.) The data is then sampled by the PHY chip on rising edges of the received 20 MHz clock signal (T_CLK). For transmission of data from the PHY chip to the SAR chip, the PHY chip clocks data out at rising edges of R_CLK. As with the 622 Mbps mode of operation, the SAR chip samples data using R_CLK. Data received by the SAR chip using R_CLK is then resynchronized or merged to the internal 40 MHz clock signal (M_CLK).

FIG. 2 illustrates components which implement the foregoing procedure and these components will now be described in further detail.

SAR chip 10 includes a 40 MHz clock generator 30 for generating M_CLK, a divide-by-divide two circuit 32 for generating a 20 MHz clock signal and an operation mode selector unit 34 for determining whether the SAR chip is to be operated at 622 Mbps or 155 Mbps and for selecting the appropriate clock signal in accordance with the selected mode. Mode selection, depending upon the implementation, may be achieved by receiving a mode selection value specifying the transmission rate. Such a value may be provided to the system during start up, perhaps from a configuration file created by a user program or a system operator.

For the transmission of data to the PHY chip, the SAR chip employs segmentation unit 36 which receives packets from host 12 (FIG. 1) and converts the packets into cells. A transmit system 38 handles transmission of data within the cells to the PHY chip. Transmit system 38 receives the 40 MHz clock signal M_CLK and clocks out data in syncyhronization with rising edges of that clock signal. Data clocked out from transmit system 38 is transmitted along line 40 to a received system 42 of PHY chip. Transmission line 40 may represent a set of physical lines contained within a UTOPIA interface bus interconnecting SAR chip 10 and PHY chip 18.

In the implementation illustrated, actual transmission of data from transmit system 38 to receiver system 42 is further controlled by a transmit system flow control unit 39 which receives a control signal from receive system 42 and the T_CLK clock signal from clock generator unit 44. Flow control unit 39 allows transmit system 38 to transmit data only if an appropriate control signal is received from receive system 42. For example, if a FIFO queue is employed within receive system 42, the control signal may indicate whether the FIFO queue is full and allow transmission of data only if it is not full. Because the control signal is received in synchronization with T_CLK, the control signal is merged to the M_CLK signal before transmission to transmit system 38.

Continuing with the overall description of FIG. 2, an output clock generator circuit 44 receives the 40 MHz and MHz clock signals and the mode signal and generates T_CLK and R_CLK for transmission to the PHY chip. When operating in the 622 Mbps mode, T_CLK is the inverted version of M_CLK whereas R_CLK is a non-inverted version of M_CLK. A clock invert circuit 45 is provided for inverting the 40 MHz signal, when in the 622 Mbps transmission mode, for use in driving the PHY chip. T_CLK and R_CLK may be delayed somewhat from M_CLK as a result of buffer delays, etc. T_CLK and R_CLK are transmitted along lines 46 and 47, respectively, to the PHY chip.

When operating in the 155 Mbps mode, T_CLK and R_CLK are both set to the 20 MHz signal received from circuit 32. As with the 622 Mbps mode, however, these clock signals may be delayed somewhat from the internal 20 MHz signal as a result of buffer delays, etc.

Receive system 42 samples data received along line 40 at rising edges of clock signal provided by line 46 then outputs the received data to optic fiber 22 (FIG. 1).

PHY chip 18 also includes a transmit system 48 which receives cells from the optic fiber for transmission to SAR chip 10. In accordance with UTOPIA protocol, transmit system 48 clocks data out on rising edges of R_CLK signal received along line 47. The data is transmitted to the SAR chip along a transmission line 50 which may include a plurality of lines forming part of the overall UTOPIA interface bus system.

SAR chip 10 includes a sample data unit 52 which receives data along line 50. Sample data unit 52 also receives the R_CLK signal directly from clock generator circuit 44 and samples of data received along line 50 at rising edges of the R_CLK signal. As noted above, the R_CLK may be delayed slightly from M_CLK as a result of buffer delays. Accordingly, a convert to internal clock unit 56 is provided for resynchronizing the received data to M_CLK. The received data, which is in a form of cells, is forwarded to a reassembly unit 58 which assembles the cells into packets for subsequent transference to host comparator 12 (FIG. 1).

Figure 3:
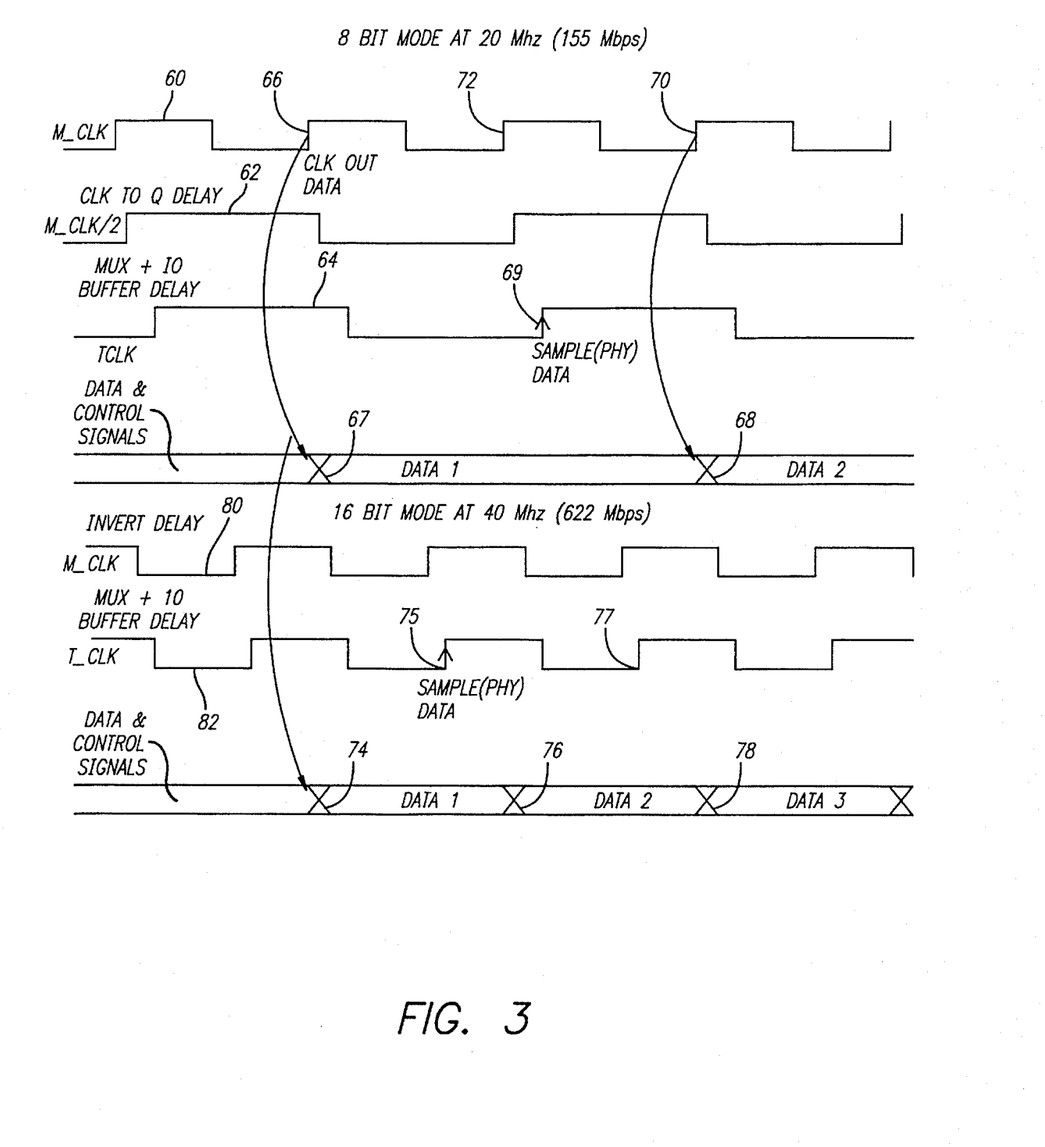
FIG. 3 is a timing diagram illustrating the transmission of data from the SAR chip to the UTOPIA PHY system of FIG. 1.
Figure 4:
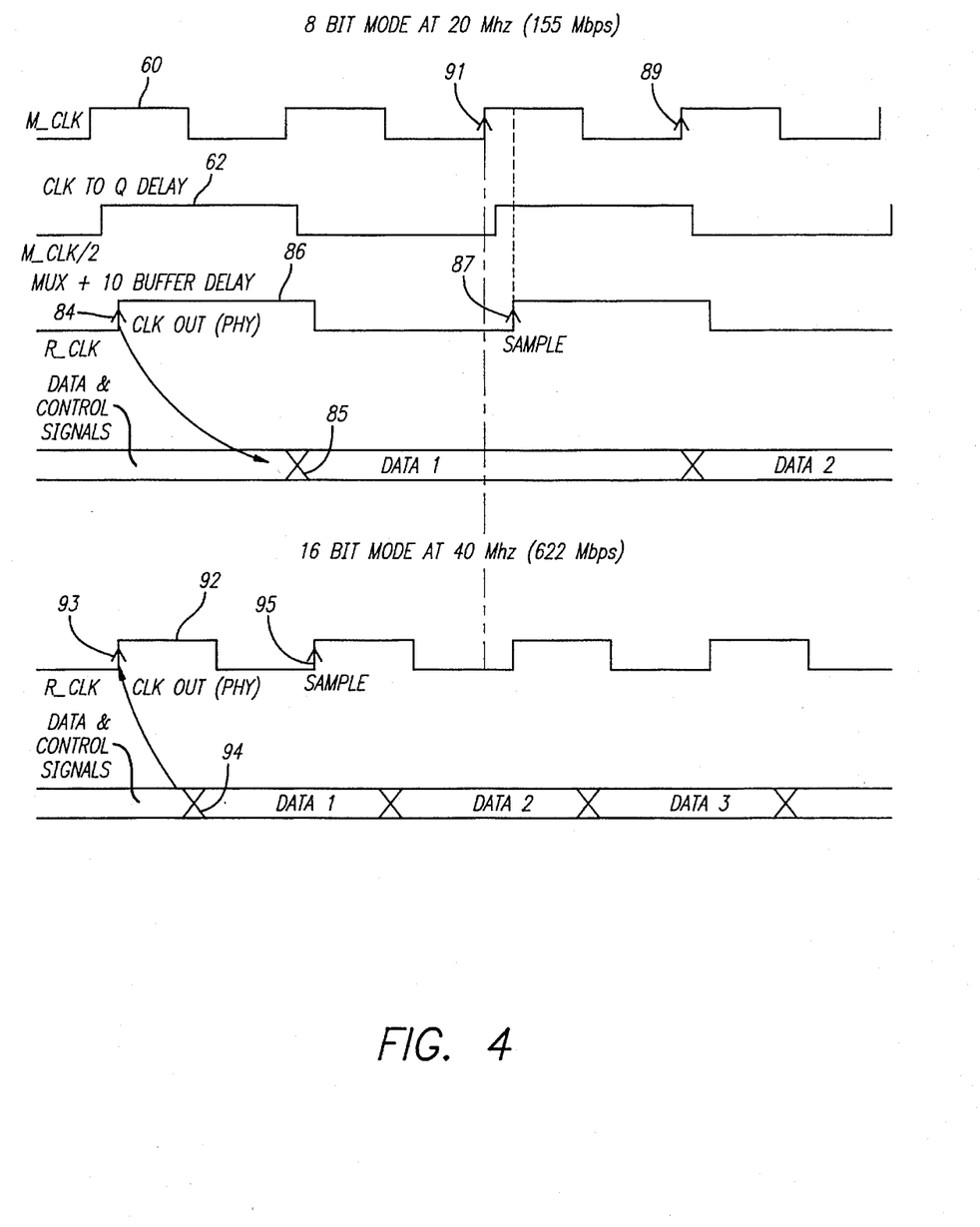
FIG. 4 is a timing diagram illustrating the reception of data transmitted from the UTOPIA PHY chip to the SAR chip of FIG. 1.

Hence, SAR chip 10 includes various components configured for synthesizing different clock signals depending upon the operational mode of the system, i.e., depending upon whether the system is operating at 622 Mbps or 155 Mbps. As noted, the clock signals are synthesized in such a manner to ensure that adequate sample and hold time is available both within the PHY chip and within the SAR chip and to eliminate, where possible, the need to merge data from one clock domain to another. This is illustrated in FIGS. 3 and 4. FIG. 3 is a timing diagram illustrating transmission of data from SAR chip 10 to PHY chip 18 at either 155 Mbps or 622 Mbps. FIG. 4 is a timing diagram illustrating the reception of data signals sent from the PHY chip to the SAR chip.

Referring first to FIG. 3, M_CLK 60 represents the 40 MHz internal clock signal. M_CLK/2 signal 62 represents the 20 MHz signal generated by circuit 32. T_CLK signal 64 represents the transmit driving clock signal sent to PHY chip along line 46. As can be seen, signal 62 and 64 are delayed somewhat from M_CLK as a result of various line or buffer delays.

Exemplary data is clocked out from transmit system 38 at rising edge 66 of M_CLK. Hence the data becomes available from the SAR chip at about time 67 and remains available until about time 68 which is tied to edge 70. The data is actually sampled by the receive system, however, at rising edge 69 of T_CLK. The time available between points 67 and 69 represents the time available for set up. The time available between points 69 and 70 represents the time available for hold. As can be seen, approximately one half a T_CLK period is available for both set up and hold which, for practical systems, is more than sufficient time. However, because T_CLK is delayed somewhat from M_CLK, the set up time available may be somewhat greater than the hold time available. This is advantageous because practical synchronous systems typically require less hold time then set up time.

A second unit of data may be clocked out from the SAR chip at edge 70 of M_CLK for subsequent sampling at the next rising edge of T_CLK (not shown).

The lower half of FIG. 3 (in conjunction with M_CLK signal 60) illustrates the transmission of data at the 622 Mbps clock rate. At 622 Mbps, data may be transmitted at every rising edge of M_CLK 60. Hence, data is transmitted at, for example, edges 66, 72 and 70 and becomes available to the PHY chip at times 74, 76 and 78, respectively. T_CLK is generated by first inverting M_CLK 60 to form an inverted clock signal 80. Inverted signal 80 is then transmitted by clock generator 44 (FIG. 2) to the PHY chip where it is received with some delay as T_CLK signal 82. Data is sampled by the PHY chip at rising edges of T_CLK. Hence, data available at time 74 is sampled at edge 75, data available at time 76 is sampled at edge 77, etc. As with the 155 Mbps system, data is thereby sampled with about a one half T_CLK period set up time and a one half T_CLK period hold time. Of course, T_CLK in the 622 Mbps mode is twice as fast as T_CLK in the 155 Mbps mode. Nevertheless, set up and hold times are substantially equal and any transmission delays cause an increase in the set up time which is advantageous.

Thus, FIG. 3 illustrates that, with proper synthesis of T_CLK, data is sampled by the PHY chip with optimal balancing of set up and hold times and without requiring any modification to the UTOPIA protocol for sampling data.

The reception of data sent by the PHY chip to the SAR chip is illustrated in FIG. 4. Data is clocked out of the PHY chip at a rising edge 84 of an R_CLK signal 86. R_CLK 86 is roughly equivalent to T_CLK signal 64 of FIG. 3 and is similarly based on M_CLK signals 60 and 62.

Data transmitted at rising edge 84 becomes available to the SAR chip at the time 85. The data is sampled by data unit 52 (FIG. 2) at the next rising edge 87 of R_CLK 86. The sampled data is then resynchronized to M_CLK by unit 56 (FIG. 2) at time 89. The time available between 87 and 89 represents the time available for resynchronizing the data to M_CLK. Data is sampled at edge 87 of R_CLK rather than edge 91 of M_CLK, in part, to ensure adequate set up and hold times. This is true because R_CLK is phase with M_CLK but delayed slightly therefrom.

Reception of data sent from the PHY chip at 622 Mbps is illustrated in the bottom half of FIG. 4. Data is clocked out from the PHY chip at a rising edge 93 of R_CLK signal 92. For the 622 Mbps mode, R_CLK is twice as fast as that of the 155 Mbps mode. Data transmitted at edge 93 becomes available for sampling by SAR chip 10 at time 94. The data is actually sampled at the next rising edge 95 of R_CLK signal 92. Resynchronization of the data to the M_CLK again occurs at clock edge 91.

Thus, FIGS. 3 and 4 illustrate that adequate set up and hold times are achieved for transmitting data at both 155 Mbps and 622 Mbps data transmission mode. The foregoing is achieved without any complicated iterative tuning. Rather such is achieved, in part, through the appropriate synthesis of clock signals T_CLK and R_CLK and by using the R_CLK signal to sample data received by SAR chip 10.

EXEMPLARY EMBODIMENT

The forgoing describes important aspects of exemplary embodiments of the invention. In the following, a specific ASIC will be described which embodies the invention. A network employing the ASIC is also described.

Figure 5:
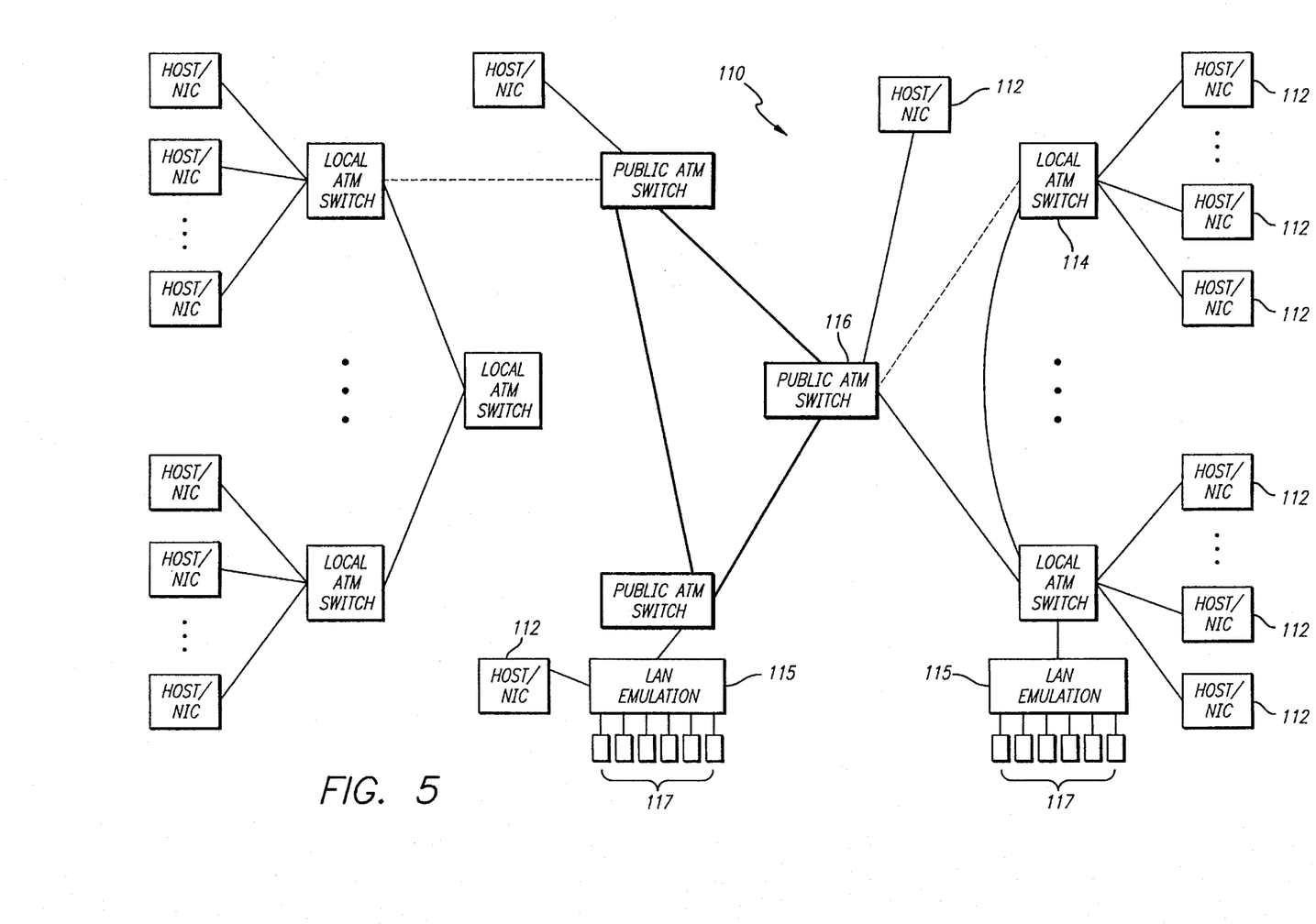
FIG. 5 is a block diagram illustrating a network employing the SAR chip of FIGS. 1–4.

FIG. 5 illustrates an exemplary computer system network 100 incorporating the SAR chip of FIGS. 1–4. Computer system network 100 includes host computer systems (not shown) which incorporate one or more network interface circuit (NIC) SAR ASIC circuits 112, perhaps embodying the architecture illustrated in FIGS. 1–4. The SAR ASICs 112 are coupled through a local ATM switch 114 to a public ATM switch 116 to enable asynchronous transfer of data between host computer systems coupled to the network 110. Alternately, SAR ASICs 112 can be coupled directly to public ATM switch 116. As shown in FIG. 5, computer system network 110 may also include computer systems which incorporate the use of a local LAN emulator 115 which serves as a gateway for connecting other networks such as Ethernet or token ring networks 117 which utilize the ATM network as a supporting framework.

Figure 6:
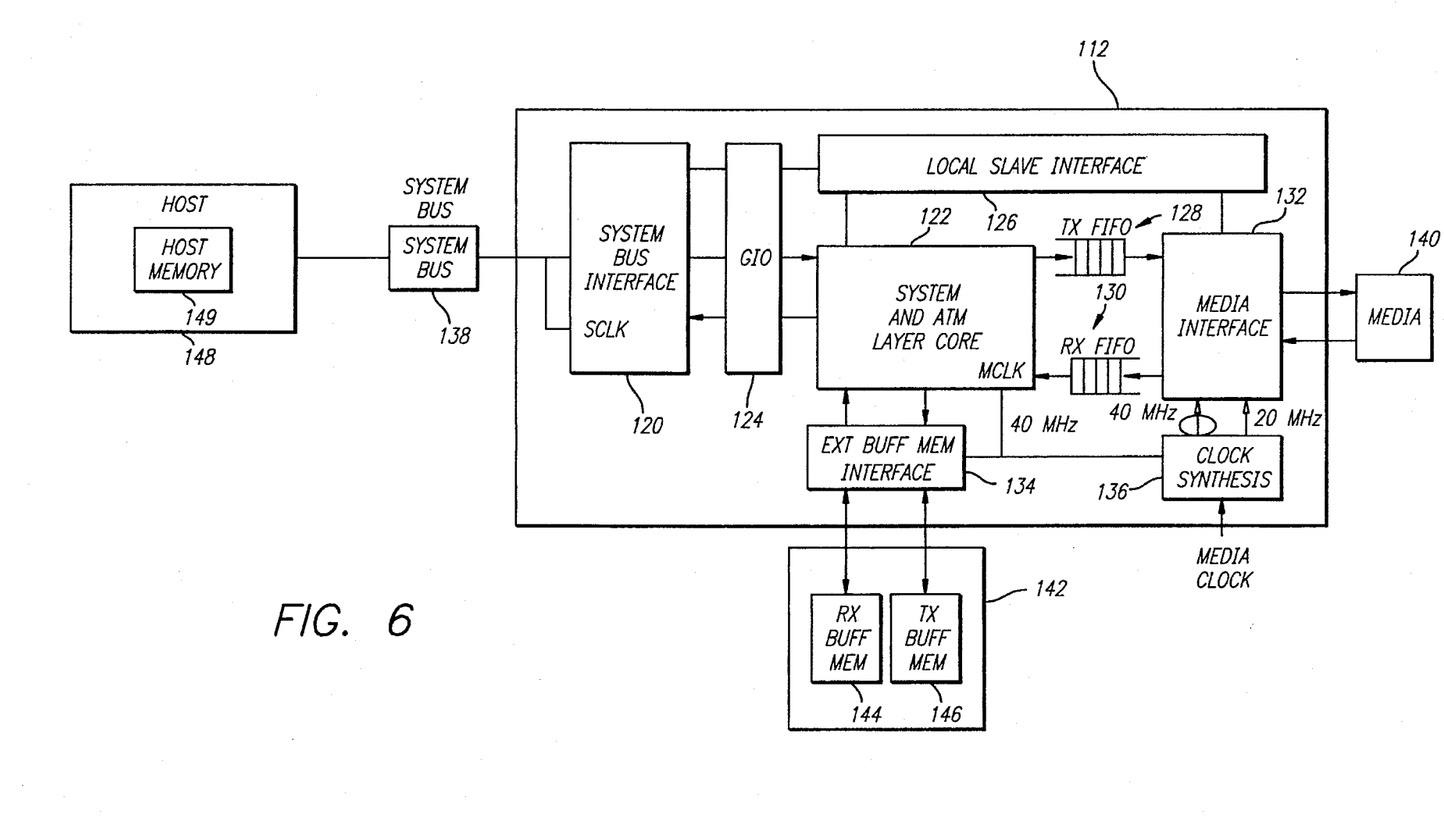
FIG. 6 is a block diagram illustrating an exemplary ASIC embodiment of the SAR chip of FIGS. 1–4 for use within the network illustrated in FIG. 5.

FIG. 6 is a simplified system diagram illustrating the architecture of the SAR ASIC 112. SAR ASIC 112 interfaces the host computer system coupled through system bus 138 to network media 140 operating in accordance with the ATM protocol.

SAR ASIC 112 shown includes a System Bus interface 120, a Generic Input/Output ("GIO") interface 124, a System and ATM Layer Core 122, a Local Slave interface 126, an array of transmit (TX) FIFOS 128, an array of receive (RX) FIFOS 130, a Media interface 132, an External Buffer Memory Interface 134 and clock synthesis circuit 136.

Together, elements 120-136 of network interface circuit 112 cooperate to asynchronously transfer data between the host computer and the other computers in the network through multiple, dynamically allocated channels in multiple bandwidth groups. Collectively, the elements of network interface circuit 112 function as a multi-channel intelligent direct memory access (DMA) controller coupled to System Bus 138 of the host computer system. In one embodiment, multiple transmit and receive channels are serviced as virtual connections utilizing a full duplex 155/ 622 Mbps physical link. Multiple packets of data, subscribed to different channels over the System Bus 138 to the external buffer memory 142, via the External Buffer Memory Interface 134, are segmented by the System and ATM Layer Core 122 into transmit cells for transmission to the Media 140 through Media interface 132. The Core 122 also includes reassembly logic to facilitate reassembly of the receive packets.

The TX and RX FIFOS 128, 130, coupled between the Core 122 and the Media Interface 132, stage the transmit and receive cell payloads of the transmit and receive packets respectively. Media Interface 132 transmits and receives cells to the Media 140 of the network, driven by clock signals provided by Clock Synthesis Circuit 136. In one embodiment, the Media, and therefore Media interface 132, conforms to the UTOPIA standard, as described by the ATM Forum Ad Hoc specification. To conform to the UTOPIA specification, and for the reasons stated above, clock synthesis circuit 136 provides either a clock signal of 20 MHz or 40 MHz to enable Media interface 132 to support a byte stream at 20 MHz for 155 Mbps or a 16 bit stream at 40 MHz for a 622 Mbps data stream.

Media Interface 132 receives 52-byte data cells each having a 4-byte cell header and a 48-byte payload from the TX FIFO 128. Media Interface 132 inserts a checksum as a fifth byte to the cell header into each cell prior to providing the 53-byte data cell to the Media 140. Conversely, when Media Interface 132 receives cells from the Media 140, interface 132 examines the checksum in the fifth byte of each cell to determine if the checksum is correct. If so, the byte representing the checksum is stripped from the cell and the cell is forwarded to the RX FIFO 130. Otherwise, the entire cell is dropped.

The System Bus Interface 120 and GIO interface 124 insulate the host computer system from the specifics of the transfer to Media 140. Furthermore, Core 122 is insulated from the specifics of system bus 138 and host data structure. In one embodiment, the System Bus is an S-Bus, as specified in the Institute of Electronics and Electrical Engineers ("IEEE") standard 1496 specification. System Bus Interface 120 is configured to communicate in accordance with the specifications of the S-Bus. System Bus Interface 120 can be configured to conform to different host computer system busses. System Bus Interface 120 is also configured to transfer and receive data in accordance with the protocols specified by GIO interface 124. GIO interface 124 provides a singular interface through which Core 122 communicates with the host computer. Thus, Core 122 need not be changed for different embodiments of ASIC 112 which interface to different host computer systems and busses. The host computer system 148 includes host memory 149 which contains data packets and pointers to the packets being transmitted and received. As noted previously, the SAR ASIC 112 also shields the cell delineation details of asynchronous transfer from the applications running on the host computer system. For present purposes, it is assumed that software running on the host computer system 148 manage transmit and receive data using wrap around transmit and receive rings with packet interfaces as is well-known in the art.

What has been described is an SAR chip for handling segmentation of packets into cells and reassembly of cells into packets for use in interconnecting a system bus connected to one or more host computers to a B-ISDN system operating with ATM. Principles of the invention, however, can be applied to other systems as well and may find utility in any data conversion system, particularly wherein data is transmitted at.

Accordingly, the exemplary embodiments described herein are merely illustrative of the general principles of the invention and should not be construed as limiting the scope of the invention.

What is claimed is:

1. In an asynchronous transfer mode interface system for interfacing with an external system, wherein the external system operates to transmit and receive data in synchronization with receive and transmit clock signals, respectively, provided by the interface system, the interface system comprising:

a clock generator for generating first and second clock signals for operating in first and second modes, respectively, with the first clock signal having a clock rate twice that of the second signal;

a transmission unit for transmitting data to the external system in the first and second modes by driving the external system with a transmit clock which is, respectively, either the first clock signal inverted or the second clock signal;

a receiving unit for receiving data from the external system in the first and second modes by driving the external system with a receive clock which is, respectively, either the first clock signal or the second clock signal and for receiving the data from the external system in synchronization with the receive clock.

2. The interface system of claim 1 wherein the external system employs UTOPIA protocol.

3. The interface system of claim 1 wherein further including a segmentation unit for receiving packets of data from a bus system and for converting the packets to cells of data and a reassembly unit for converting cells of data into packets of data for transmission to the bus system.

4. The interface system of claim 3 wherein the bus system is an SBus.

5. The interface system of claim 1 wherein the rates of the first and second clock signals are about 40–50 MHz and 20–25 MHz respectively.

6. The interface system of claim 5 wherein data transmission rates for the first and second modes are, respectively, 622 Mbps and 155 Mbps.

7. In an asynchronous transfer mode interface system for interfacing with an external system, wherein the external system operates to transmit and receive data in synchronization with receive and transmit clock signals, respectively, provided by the interface system, a method for transmitting data to, and receiving data from, the external system comprising the steps of:

generating first and second clock signals for operating in first and second modes, respectively, with the first clock signal having a clock rate twice that of the second clock signal;

transmitting data to the external system in the first and second modes by driving the external system with a transmit clock which is, respectively, either the first clock signal inverted or the second clock signal;

receiving data from the external system in the first and second modes by driving the external system with a receive clock which is, respectively, either the first clock signal or the second clock signal and for receiving the data from the external system in synchronization with the receive clock.

8. The method of claim 7 wherein the external system employs the UTOPIA protocol.

9. The method of claim 7 wherein the interface system further performs the steps of receiving packets of data from a bus system and converting the packets of data to cells of data for transmission to the external system; and converting cells of data received from the external system into packets of data for transmission to the bus system.

10. The method of claim 7 wherein the bus system is an SBus.

11. The method of claim 7 wherein the rates of the first and second clock signals are about 40–50 MHz and 20–25 MHz respectively.

12. The method of claim 11 wherein data transmission rates for the first and second modes are, respectively, 622 Mbps and 155 Mbps.

13. A system comprising:

a host computer;

an asynchronous transfer mode system;

an asynchronous transfer mode interface system for interconnecting the computer system and the asynchronous transfer mode system and for providing a transmit clock signal and a receive clock signal to the asynchronous transfer mode system for use in, respectively, transmitting data to, and receiving data from, the asynchronous transfer mode system;

a clock generator, within the asynchronous transfer mode interface system, for generating first and second clock signals for operating in first and second modes, respectively, with the first clock signal having a clock rate twice that of the second clock signal;

a transmission unit, within the interface system, for transmitting data to the asynchronous transfer mode system in the first and second modes by driving the asynchronous transfer mode system with the transmit clock which is, respectively, either the first clock signal inverted or the second clock signal; and a receiving unit, within the interface system, for receiving data from the asynchronous transfer mode system in the first and second modes by driving the asynchronous transfer mode system with a receive clock which is, respectively, either the first clock signal or the second clock signal and for receiving the data from the asynchronous transfer mode system in synchronization with the receive clock.

14. The system of claim 13 wherein the external system employs a UTOPIA protocol.

15. The system of claim 13 wherein the interface system further includes a segmentation unit for receiving packets of data from a bus system and for converting to cells of data for transmission to the external system and a reassembly unit for converting cells of data received from the external system into packets of data for transmission to the bus system.

16. The system of claim 15 wherein the bus system is an SBus.

17. The system of claim 13 wherein the rates of the first and second clock signals are about 40–50 MHz and 20–25 MHz respectively.

18. The system of claim 17 wherein data transmission rates for the first and second modes are, respectively, 622 Mbps and 155 Mbps.

19. The system of claim 13 wherein the asynchronous transfer mode system is a physical layer interface chip.

20. The system of claim 13 wherein the asynchronous transfer mode interface system is a segmentation and reassembly unit.

* * * * *

UNITED STATES PATENT AND TRADEMARK OFFICE
CERTIFICATE OF CORRECTION

PATENT NO. : 5,600,650
DATED : February 4, 1997
INVENTOR(S) : Oskouy It is certified that error appears in the above-identified patent and that said Letters Patent is hereby corrected as shown below:

In claim 13, at line 14, please delete "dock" and insert --clock--.

Signed and Sealed this

Thirty-first Day of August, 1999

Attest:

Q. TODD DICKINSON

*Attesting Officer*     *Acting Commissioner of Patents and Trademarks*